US009558618B2

(12) United States Patent
Petersen et al.

(10) Patent No.: US 9,558,618 B2
(45) Date of Patent: Jan. 31, 2017

(54) USING A MESSAGE-ORIENTED PROTOCOL IN A GAMING MACHINE

(71) Applicant: IGT, Reno, NV (US)

(72) Inventors: Erik B. Petersen, Reno, NV (US); Kevin Higgins, Reno, NV (US); David L. Kern, Jr., Las Vegas, NV (US); Russell Klenk, Las Vegas, NV (US); Danny Miles, Reno, NV (US); William Chad Little, Las Vegas, NV (US)

(73) Assignee: IGT, Las Vegas, NV (US)

( * ) Notice: Subject to any disclaimer, the term of this patent is extended or adjusted under 35 U.S.C. 154(b) by 590 days.

(21) Appl. No.: 13/693,991

(22) Filed: Dec. 4, 2012

(65) Prior Publication Data

US 2014/0155173 A1 Jun. 5, 2014

(51) Int. Cl.

*G06F 15/16* (2006.01)
*G07F 17/32* (2006.01)
*A63F 9/24* (2006.01)

(52) U.S. Cl.

CPC .................................. *G07F 17/3225* (2013.01)

(58) Field of Classification Search

CPC ...... G06Q 10/107; H04L 12/585; H04L 12/58
USPC .......................................................... 709/206
See application file for complete search history.

(56) References Cited

U.S. PATENT DOCUMENTS

2010/0227689 A1* 9/2010 Brunet de Courssou et al. ................................ 463/37
2010/0306547 A1* 12/2010 Fallows et al. ............... 713/178
2011/0099232 A1* 4/2011 Gupta ............... H04L 29/08729 709/206

OTHER PUBLICATIONS

Best-effort delivery, printed on Sep. 18, 2012 from Wikipedia at internet site http://en.wikipedia.org/wiki/Best-effort_delivery, 1 page.
Enterprise service bus, printed on Sep. 19, 2012 from Wikipedia at internet site http://en.wikipedia.org/wiki/Enterprise_service_bus, 9 pages.
Message-oriented middleware, printed on Sep. 18, 2012 from Wikipedia at internet site http://en.wikipedia.org/wiki/Message-oriented_middleware, 3 pages.
Publish-subscribe pattern, printed on Sep. 19, 2012 from Wikipedia at internet site http://en.wikipedia.org/wiki/Publish-subscribe, 4 pages.
Streaming Text Oriented Message Protocol, printed on Sep. 18, 2012 from Wikipedia at internet site http://en.wikipedia.org/wiki/Streaming_Text_Oriented_Messaging_Protocol, 2 pages.

(Continued)

*Primary Examiner* — Chris Parry
*Assistant Examiner* — Alan S Chou
(74) *Attorney, Agent, or Firm* — Neal, Gerber & Eisenberg LLP

(57) ABSTRACT

A gaming machine, such as a video slot or video poker machine, may be configured to use a message-oriented protocol. An application on the gaming machine may request subscription to a topic managed by a message broker. The application may receive a message published to the topic by another application and alter its execution in response.

14 Claims, 5 Drawing Sheets

(56) References Cited

OTHER PUBLICATIONS

UDI Dahan, Bus and Broker Pub/Sub Differences, dated Mar. 24, 2011, printed at internet site www.udidahan.com/2011/03/24/bus-and-broker-pubsub-differences/, 7 pages.
General Description of Hangman, printed at internet site www.cs.bgu.ac.il/~spl101/index.php?page=Assignments.Assignment_3.Description, 8 pages.
General Description of Stock Market Simulation, printed at internet site www.cb.bgu.ac.il/~spl111/Assignments/Assignment_3/Description, 11 pages.

* cited by examiner

USING A MESSAGE-ORIENTED PROTOCOL IN A GAMING MACHINE

BACKGROUND

1. Field of the Described Embodiments

The present disclosure relates generally to gaming machines, and more particularly to using a message-oriented protocol within a gaming machine.

2. Description of the Related Art

Many of today's gaming casinos and other entertainment locations feature different single and multi-player gaming systems such as slot machines and video poker machines. The gaming machines may include a number of hardware and software components to provide a wide variety of game types and game playing capabilities. Exemplary hardware components may include bill validators, coin acceptors, card readers, keypads, buttons, levers, touch screens, coin hoppers, ticket printers, player tracking units and the like. Software components may include, for example, boot and initialization routines, various game play programs and subroutines, credit and payout routines, image and audio generation programs, various component modules and a random or pseudo-random number generator, among others.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personnel (e.g., gaming control personnel) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

In many casinos and other entertainment locations, the gaming machines may be networked to one or more devices that monitor the functions of the gaming machines during operation. For example, an accounting system may monitor the amount of credits received by a gaming machine and the amount of credits paid out by the gaming machine. Such an accounting system allows the operator of the gaming machines to analyze the profitability of the gaming machines, the use of the gaming machines, and similar metrics.

The operating system of a gaming machine may be configured to use one of a variety of gaming protocols, i.e., communications protocols specifically designed for use in a gaming environment, such as a casino. Such a gaming protocol may be promulgated by an organization that defines standards for the gaming industry. One exemplary protocol is the Slot Accounting System (SAS) Protocol, pioneered by International Game Technology (IGT) and recognized in 2002 by the Gaming Standards Association (GSA) as an industry standard. A more recent communications protocol in the gaming industry is the Game to System (G2S) Protocol, also recognized by the GSA as an industry standard. Thus, many casinos and other gaming environments may have existing infrastructure to communicate data between gaming machines and a server. For example, a server may provide an indication to a gaming machine that the player has won a collective jackpot.

SUMMARY

According to various example embodiments, a method of using a message-oriented protocol in a gaming machine is disclosed. The method includes generating, by a processing circuit of the gaming machine, a topic subscription request by a first application on the gaming machine. The method also includes sending the topic subscription request to a message broker. The method further includes receiving, at the processing circuit, a message published to a topic corresponding to the topic subscription request, the message being published to the topic by a second application. The method additionally includes altering the execution of the first application on the gaming machine based in part on the received message.

According to another embodiment, a gaming machine is disclosed. The gaming machine includes a processing circuit configured to generate a topic subscription request by a first application on the gaming machine and to send the topic subscription request to a message broker. The processing circuit is also configured to receive a message published to a topic corresponding to the topic subscription request, the message being published to the topic by a second application. The processing circuit is further configured to alter the execution of the first application on the gaming machine based in part on the received message.

According to another example embodiment, a computer-readable storage medium having machine instructions stored therein is disclosed. The instructions are executable by a processor to cause the processor to perform operations. The operations include generating a topic subscription request by a first application on the gaming machine and sending the topic subscription request to a message broker. The operations also include receiving a message published to a topic corresponding to the topic subscription request, the message being published to the topic by a second application. The operations further include altering the execution of the first application on the gaming machine based in part on the received message.

In a further exemplary embodiment, a method of using a message-oriented protocol in a gaming environment is disclosed. The method includes generating, by a processing circuit of a server, a topic subscription request by a first application on the server. The method also includes sending the topic subscription request to a message broker. The method further includes receiving, at the processing circuit, a message published to a topic corresponding to the topic subscription request, the message being published to the topic by a second application, the second application being executed on an electronic gaming machine in communication with the server.

In an additional exemplary embodiment, a computing device for use with a gaming environment is disclosed. The computing device includes a processing circuit configured to generate a topic subscription request by a first application being executed by the processing circuit. The processing circuit is also configured to send the topic subscription request to a message broker. The processing circuit is further configured to receive a message published to a topic corresponding to the topic subscription request, the message being published to the topic by a second application. The second application is executed on an electronic gaming machine in communication with the computing device.

BRIEF DESCRIPTION OF THE DRAWINGS

The details of one or more implementations are set forth in the accompanying drawings and the description below.

Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments disclosed herein, a message-oriented protocol may be implemented in a gaming environment. In general, a message-oriented protocol allows applications to subscribe to various topics managed by a message broker. A message posted by an application to a topic may be broadcast by the message broker to any applications subscribed to the topic. In some embodiments, a message-oriented protocol may be used within a gaming machine to allow different applications on the machine to communicate. For example, a first application on the gaming machine may communicate with a second application on the gaming machine by posting a message to a topic. If the second application is subscribed to the topic, the second application may then receive the posted message. In further embodiments, an application on a gaming machine may communicate with an application on a remote device (e.g., another gaming machine, a server, etc.) using the message-oriented protocol. For example, a central server may be configured to maintain an accounting of received funds and payouts from a deployed gaming machine by subscribing to one or more related topics. Whenever the gaming machine receives funds from a player or pays out to a player, it may post to the one or more topics, so that the server receives the message. In some embodiments, a message sent via the message-oriented protocol may be wrapped in a gaming protocol, such as G2S, when sent between a gaming machine and another device in the gaming environment.

Figure 1:
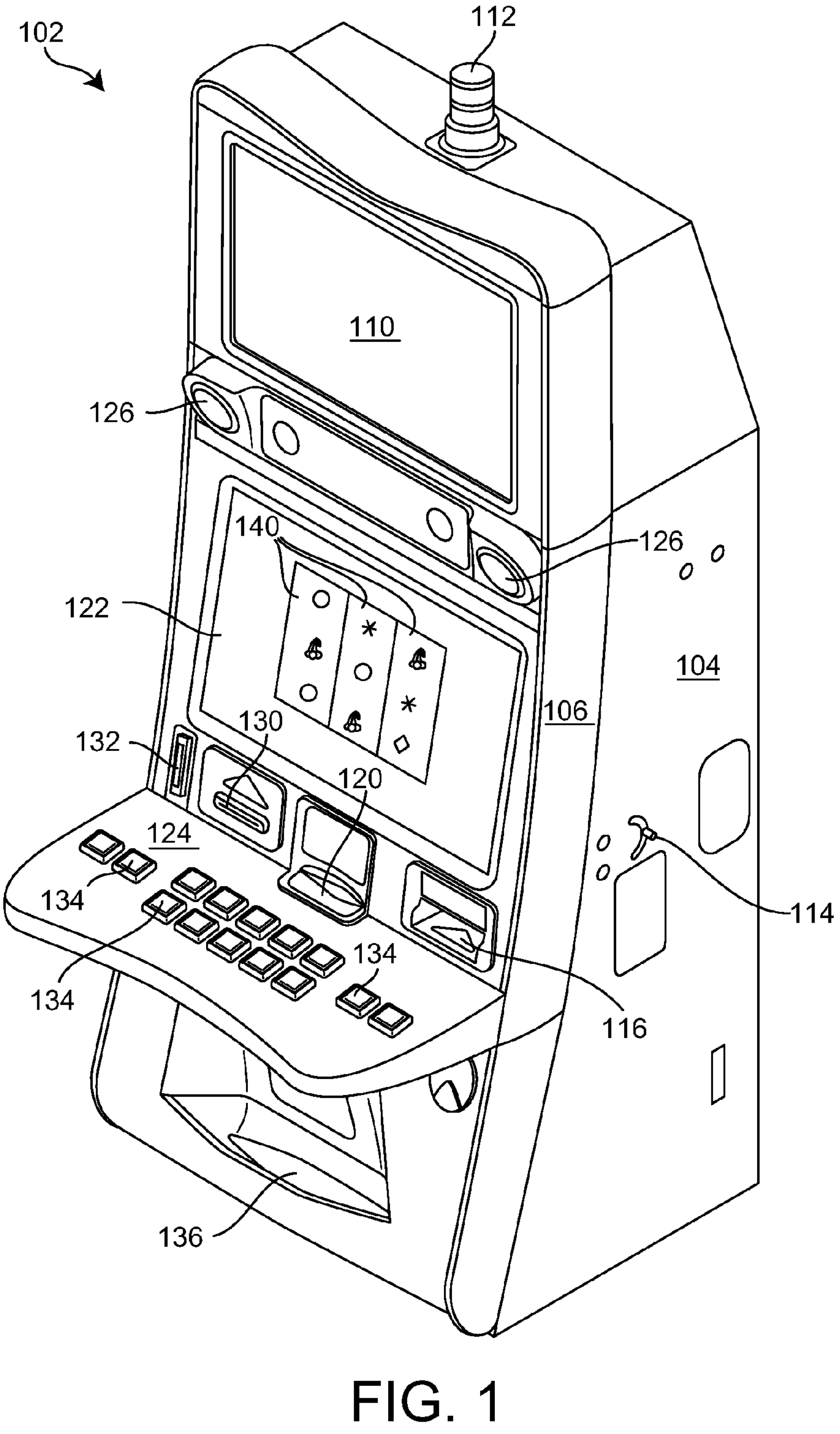
FIG. 1 is an illustration of a gaming machine, according to an exemplary embodiment.

Referring to FIG. 1, a perspective drawing of an electronic gaming machine 102 is shown in accordance with described embodiments. Gaming machine 102 may include a main cabinet 104. Main cabinet 104 may provide a secure enclosure that prevents tampering with device components, such as a game controller (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some embodiments, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include electronic displays 110, 122, speakers 126, and/or a candle device 112 to convey information to the user of gaming machine 102. Gaming machine 102 may also include a console 124 having one or more inputs 134 (e.g., buttons, track pads, etc.) configured to receive input from a user. In one embodiment, display 110 and/or display 122 may also be a touch screen display configured to receive input from a user. A controller (not shown) within gaming machine 102 may run a game, such as a wager-based game, in response to receiving input from a user via inputs 134, display 122, or display 110. For example, inputs 134 may be operated to place a wager in the game and to run the game. In response, the controller may cause reels shown on display 122 to spin, such as with a software-based slot game.

Gaming machine 102 may also include devices for conducting a wager-based game. For example, gaming machine 102 may include a ticket acceptor 116 and a printer 120. In various embodiments, gaming machine 102 may be configured to run on credits that may be redeemed for money and/or other forms of prizes. Ticket acceptor 116 may read an inserted ticket having one or more credits usable to play a game on gaming machine 102. For example, a player of gaming machine 102 may wager one or more credits within a video slot game. If the player loses, the wagered amount may be deducted from the player's remaining balance on gaming machine 102. However, if the player wins, the player's balance may be increased by the amount won. Any remaining credit balance on gaming machine 102 may be converted into a ticket via printer 120. For example, a player of gaming machine 102 may cash out of the machine by selecting to print a ticket via printer 120. The ticket may then be used to play other gaming machines or redeemed for cash and/or prizes. According to various embodiments, gaming machine 102 may record data regarding its receipt and/or disbursement of credits. For example, gaming machine 102 may generate accounting data whenever a result of a wager-based game is determined. In some embodiments, gaming machine 102 may provide accounting data to a remote data collection device, allowing the remote monitoring of gaming machine 102.

In one embodiment, gaming machine 102 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing gaming machine 102. For example, a user having a loyalty account may be given a bonus turn on gaming machine 102 or credited loyalty points for playing gaming machine 102. Such loyalty points may be exchanged for loyalty rewards (e.g., a free meal, a free hotel stay, free room upgrade, discounts, etc.).

Figure 2:
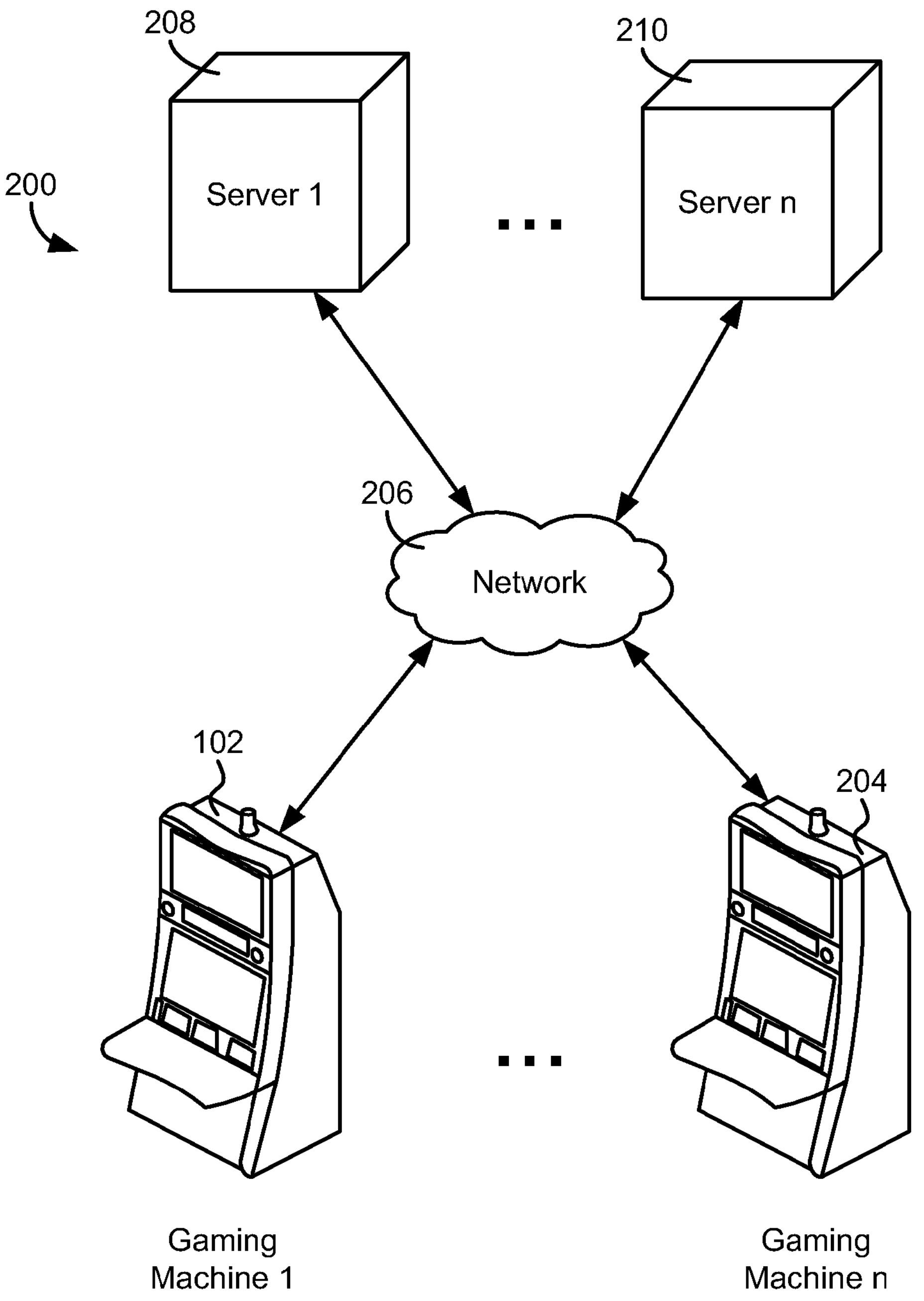
FIG. 2 is an illustration of a gaming environment, according to an exemplary embodiment.

Referring now to FIG. 2, an illustration of a gaming environment 200 is shown, according to an exemplary embodiment. Gaming environment 200 may be within, for example, a casino, a racetrack, a hotel, or other entertainment location. As shown, gaming environment 200 may include any number of gaming machines. For example, gaming environment 200 may include gaming machine 102 shown in FIG. 1 through a gaming machine 204 (i.e., a first gaming machine through nth gaming machine). Gaming environment 200 may also include any number of remote servers and other devices, such as servers 208 through server 210 (e.g., a first server through nth server). Gaming environment may further include a network 206 through which gaming machines 102, 204 and servers 208, 210 communicate.

Network 206 may be any form of communications network that conveys data between gaming machines 102, 204 and servers 208, 210. In one embodiment, network 206 may also convey data between gaming machines 102, 204. For example, gaming machines 102, 204 may be gaming machines that execute a particular type of game that allows for social gaming (e.g., a player of gaming machine 102 may coordinate some of his or her in-game actions with the player of gaming machine 204, to achieve certain collaborative goals, bonuses, etc.). Network 206 may include any number wired or wireless connections, in various embodiments. For example, server 208 may communicate with server 210 over a wired connection that includes a serial cable, a fiber optic cable, a CAT5 cable, or any other form of wired connection. In another example, server 208 may communicate with gaming machine 102 via a wireless connection (e.g., via WiFi, cellular, radio, etc.). Network 206 may also include any number of local area networks (LANs), wide area networks (WANs), or the Internet. For example, gaming machine 208 may communicate with server 210 via a casino's LAN connected to the Internet. Accordingly, network 206 may include any number of intermediary networking devices, such as routers, switches, servers, etc.

Servers 208, 210 may be one or more electronic devices connected to network 206 configured to collect data from gaming machines 102, 204 and/or provide data to gaming machines 102, 204. For example, servers 208, 210 may be single computers, a collection of computers, or data centers. Servers 208, 210 may include one or more data storage devices in communication with one or more processors. The data storage devices may store machine instructions that, when executed by the one or more processors, cause the one or more processors to perform the functions described with regard to servers 208, 210. Generally, servers 208, 210 may be configured to receive and store data regarding gaming machines 102, 204 and to provide data to gaming machines 102, 204. In some cases, servers 208, 210 may perform data analysis on the received data. For example, one or more of servers 208, 210 may determine averages, trends, metrics, etc., for one or more of gaming machines 102, 204. Data may be sent between gaming machines 102, 204 and servers 208, 210 in real-time (e.g., whenever a change in credits or cash occurs, whenever another type of system event occurs, etc.), periodically (e.g., every fifteen minutes, every hour, etc.), or in response to a receiving a message from one of the devices.

In various embodiments, servers 208, 210 and gaming machines 102, 204 may utilize a gaming protocol, such as G2S or SAS, to communicate via network 206. Such a gaming protocol may include security features to ensure the integrity of communications between the devices in gaming environment 200. For example, a communication between gaming machine 102 and server 208 using G2S may be encrypted using a secure socket layer (SSL) encryption technique. The communication may then be decrypted by the receiving device, thereby ensuring the integrity of the communicated data.

The data communicated between servers 208, 210 and gaming machines 102, 204 may include accounting data. Accounting data may be, but is not limited to, data indicative of credits received or paid out by gaming machines 102, 204. Servers 208, 210 may process the collected accounting data and generate one or more reports regarding the financial state of gaming machines 102, 204 (e.g., the amount of money that a gaming machine has generated or lost, the amount of use of the gaming machine by players, which games were played on the machine, etc.). The data communicated between servers 208, 210 and gaming machines 102, 204 may also include operational data. In general, operational data may be any other form of data indicative of the operational state of gaming machines 102, 204. For example, operational data may include data indicative of the number of games played on gaming machines 102, 204, the types of games played on gaming machines 102, 204, errors or alerts generated by gaming machines 102, 204, whether gaming machines 102, 204 are currently in use, etc. Servers 208, 210 may use the received operational data to allow gaming machines 102, 204 to be monitored. Servers 208, 210 may also provide notifications if maintenance is required for any of gaming machines 102, 204. For example, a notification may be sent to a display (e.g., a display attached to server 208, a display of a handheld device operated by a technician, etc.), so that an error may be corrected.

In some embodiments, data communicated between servers 208, 210 and gaming machines 102, 204 may include data related to a user's loyalty account. For example, a user of gaming machine 102 may link their loyalty account to gaming machine 102, so that she can gain loyalty points, free turns, etc., while playing gaming machine 102. A user may link his or her loyalty account to gaming machine 102 in any number of ways. For example, the user may insert a loyalty card into gaming machine 102, provide biometric data to gaming machine 102 (e.g., by conducting a finger print scan, a retinal scan, etc.), and so on. In some cases, a mobile device operated by the user may provide data regarding the user's loyalty account to gaming machine 102. The mobile device may transfer data to gaming machine 102 wirelessly (e.g., via Bluetooth, WiFi, etc.), via a wired connection (e.g., via a USB cable, a docking station, etc.), via the user's body (i.e., the mobile device transmits data through the user's body and into gaming machine 102), or in another manner. The receiving server may then associate the user's time playing gaming machine 102 with the user's loyalty account (e.g., to add loyalty points to the user's account, to provide certain rewards to the user, such as a bonus turn, etc.).

One or more of servers 208, 210 may provide other forms of data to gaming machines 102, 204 via network 206. For example, servers 208, 210 may notify a user of gaming machine 102 that the user qualifies for a loyalty award, such as a free meal, a free night in a hotel, a discount, a bonus turn, or other loyalty-related information. In some cases, one or more of servers 208, 210 may provide a service window to gaming machine 102 via display 122. For example, the service window may appear within a Flash application executed by gaming machines 102. A service window may allow notifications to be provided by servers 208, 210 to an individual user during game play.

A messaging-oriented protocol may be implemented in one or more of the devices in gaming environment 200. As used herein, a message-oriented protocol refers to any messaging protocol that allows applications to subscribe or publish messages to a topic. Sometimes referred to as message-oriented middleware (MOM), a message-oriented protocol may use a message broker application to coordinate and maintain the receiving and transmitting of messages. Such a message broker may be implemented at one or more of the devices in gaming environment 200. In one embodiment, the messaging-oriented protocol used in gaming environment 200 may be, or may be based on, the Simple Text Oriented Messaging Protocol (STOMP). Under STOMP, messages may be sent in text-based frames containing various commands (e.g., CONNECT, SUBSCRIBE, SEND, etc.). Since the messages are text-based, the messaging-protocol may be independent of the various programming languages and system types used in gaming environment 200.

In one embodiment, a gaming machine, such as gaming machine 102, may execute a message broker configured to manage messages between different applications installed on gaming machine 102. For example, a slot-based game application on gaming machine 102 may publish a message to a bonus-related topic managed by the local message broker. Another application, such as bonus-determining application, may subscribe to the bonus-related topic to receive bonus-related messages published by the slot game. In another embodiment, one of server 208, 210 may execute the message broker. For example, server 208 may execute a message broker that allows applications on the devices of gaming environment 200 to communicate with one another.

The message-oriented protocol used in gaming environment 200 may allow for asynchronous messaging. For example, gaming machine 102 may post a message to a topic managed by a message broker on server 208. Also, assume that an application on gaming machine 204 is subscribed to the topic, but that gaming machine 204 is down for maintenance when the message is posted. In such a case, gaming machine 204 may still receive the message at a later time. Thus, the messaging-oriented protocol may follow only a best-effort delivery model, in some embodiments. In contrast to other protocols that guarantee the delivery of messages, a best-effort delivery model has no such guarantee. For example, one protocol may require the preallocation of network resources and a return receipt message, to ensure that a sent message is received at the other end. In a best-effort delivery model, however, no such steps may be taken. In other words, a message may be published to a topic in gaming environment 200 regardless of the applications that are currently subscribed to the topic and regardless of whether the message is delivered to each of the subscribed applications (e.g., a machine executing a subscribed application may be turned off, may be disconnected from network 206, etc.).

Regardless of where the message broker is implemented, using a message-oriented protocol in gaming environment 200 allows applications in the environment to communicate with one another without having to modify the programming of the applications, when message recipients are added, changed, or removed. For example, assume that application A on gaming machine 102 is configured to communicate a particular type of message to application B on server 208. Also, assume that a new application C is to be installed on gaming machine 204 that could also rely on the message. In some cases, application A may be configured only to communicate the message to application B, requiring application A to be modified to also send the message to application C. However, if a message-oriented protocol is used, the message may be published to a topic managed by the message broker. In such a case, application C may simply subscribe to the topic to receive messages from application A, without further changes to the code of application A.

Figure 3:
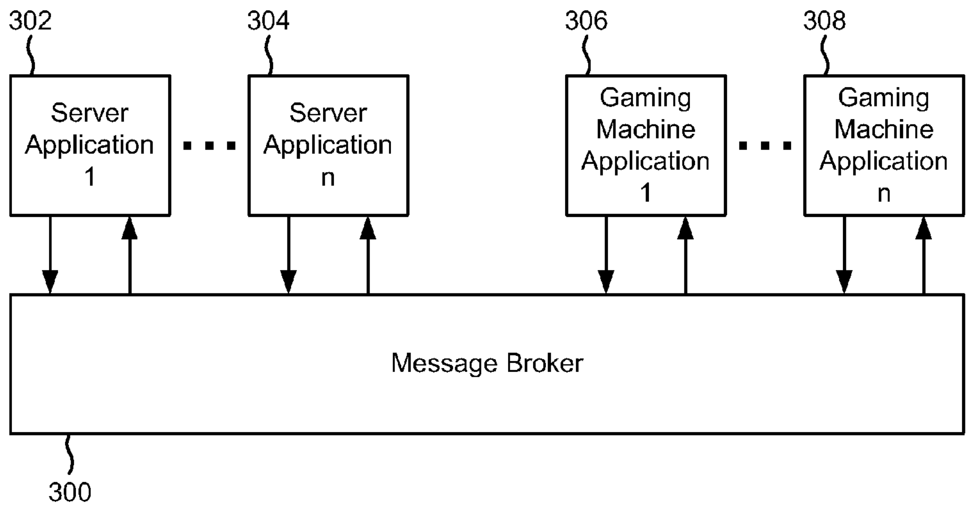
FIG. 3 is a block diagram of a message broker, according to one embodiment.

Referring now to FIG. 3, a block diagram of a message broker 300 of a messaging protocol is shown, according to one embodiment. As shown, message broker 300 may be implemented in a gaming environment, such as gaming environment 200 shown in FIG. 2. Any number of applications running on the various machines of a gaming environment may communicate via message broker 300. For example, server applications 302, 304 (e.g., a first through nth server application) and gaming machine applications 306, 308 (e.g., a first through nth gaming machine application) may communicate via message broker 300. Applications 302-308 may be any form of software applications or processes configured to send messages via a message-oriented protocol. Message broker 300 may be a software and/or hardware module configured to manage the delivery of messages among applications 302-308. Message broker 300 may be implemented at any of the devices executing applications 302-308 or may be implemented at a different device in communication with the other devices. Since the message broker 300 handles the passing of messages, messages may be sent in a bi-directional manner between any of applications 302-308.

In some embodiments, message broker 300 may be configured to operate in a hub-and-spoke manner where message delivery depends on the availability of message broker 300. In one embodiment, message broker 300 may maintain any number of message queues for different topics. Exemplary actions that may be performed by applications 302-308 via message broker 300 may include, but are not limited to, the creation of topics, publishing a message to a topic, subscribing to a topic, acknowledging receipt of a message, and unsubscribing from a topic. For example, server application 302 may publish a message to a particular topic managed by message broker 300. In response, message broker 300 may deliver the message to any of applications 302-308 that are subscribed to the topic.

In an alternate embodiment, message broker 300 may be a message BUS that does not require a single message broker to disseminate messages to topic subscribers. Instead, a message may be broadcast by one of applications 302-308 and received by the other applications. If the receiving application is subscribed to the topic of the message, the receiving application may process the message. For example, application 302 may post a message to the message BUS regarding a particular topic. The message may then be received by one or more of applications 304-308. If application 308, for example, is subscribed to the topic, it may process the message.

Since the message-oriented protocol used by message broker 300 is system and language independent, messages communicated between applications 302-308 may be wrapped using a particular communication protocol, such as a gaming protocol. For example, message broker 300 may handle messages that conform to the message-oriented protocol, STOMP. A text-based message conforming to STOMP may be generated by one of applications 302-308 and transmitted by its respective device using G2S to the device executing message broker 300. At the receiving device, the G2S communication may be unwrapped into the original STOMP message and processed by message broker 300. If the message is to be delivered to another local application on the device that executes message broker 300, message broker 300 may deliver the message using STOMP. However, if the message is to be delivered to an application on a remote device, the device executing message broker 300 may similarly convert the STOMP message into the G2S format and transmit it to the remote device.

Figure 4:
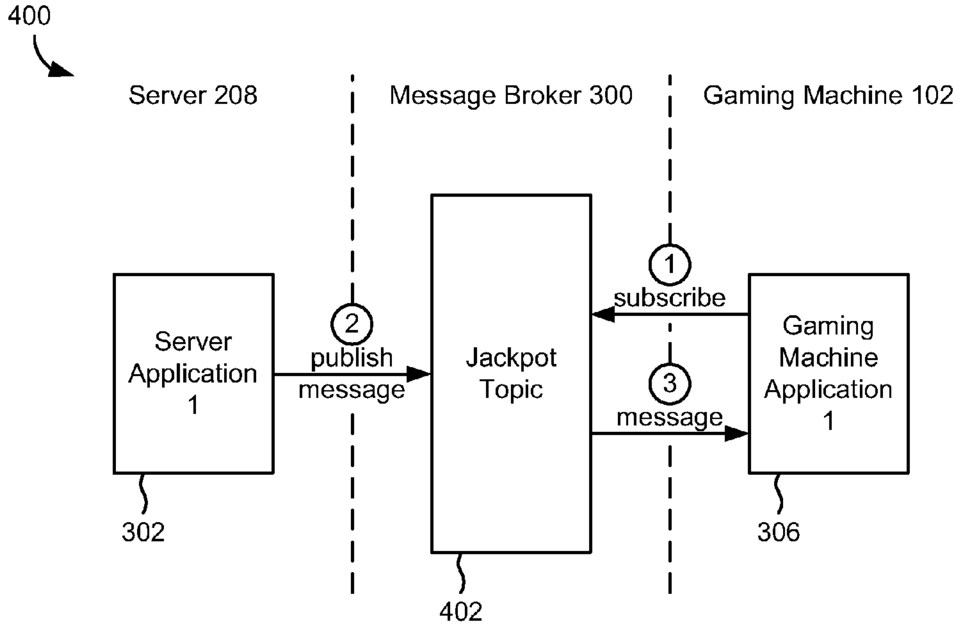
FIG. 4 is an example illustration of a gaming environment using a message-oriented protocol, according to an exemplary embodiment.

Referring now to FIG. 4, an example illustration 400 is shown of a gaming environment using a message-oriented protocol, according to an exemplary embodiment. In the example shown, server 208 and gaming machine 102 shown in FIG. 2 may communicate via network 206. Server 208 may execute server application 302 shown in FIG. 3 and gaming machine 102 may execute gaming machine application 306. Message broker 300 may be executed on server 208, gaming machine 102, or another device connected to network 206, according to various embodiments, to broker the communication of messages between.

Message broker 300 may manage messages posted to a topic 402. For example, assume that gaming machine 102 is part of a bank of gaming machines that have a collective jackpot. Whether the collective jackpot is won at one of the gaming machines may be determined by server 208, which is in communication with the bank of gaming machines. Gaming machine 102 may execute gaming machine application 302, such as a slot game. Gaming machine application 306 may subscribe to topic 402, thereby making application 306 one of the gaming machines eligible to pay out the collective jackpot. Server application 202 may determine that the player of gaming machine 102 has won the jackpot and publish a message to topic 402. In response, message broker 300 may distribute the message to gaming machine 102 that the player has won.

Figure 5:
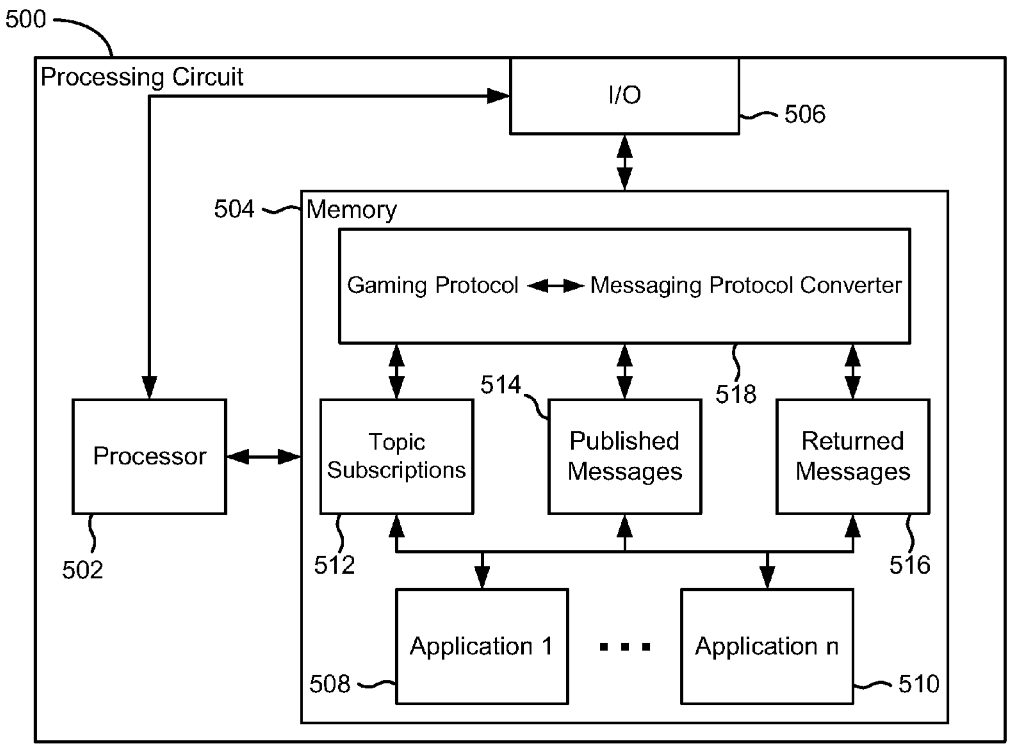
FIG. 5 is a block diagram of a processing circuit, according to an exemplary embodiment.

Referring now to FIG. 5, a block diagram 300 of a processing circuit 500 is shown, according to an exemplary embodiment. Processing circuit 500 may be a processing component of any electronic device used as part of a gaming environment. For example, any of servers 208, 210 or gaming machines 102, 204 shown in FIG. 2 may include processing circuit 500. In another embodiment, processing circuit 500 may be part of a computing system that includes multiple devices. In such a case, processing circuit 500 may represent the collective components of the system (e.g., processors, memories, etc.).

Processing circuit 500 may include a processor 502 and a memory 504. Memory 504 stores machine instructions that, when executed by processor 502, cause processor 502 to perform one or more operations described herein. Processor 302 may include a microprocessor, FPGA, ASIC, any other form of processing electronics, or combinations thereof. Memory 504 may be any electronic storage medium such as, but not limited to, a floppy disk, a hard drive, a CD-ROM, a DVD-ROM, a magnetic disk, RAM, ROM, EEPROM, EPROM, flash memory, optical memory, or combinations thereof. Memory 504 may be a tangible storage medium that stores non-transitory machine instructions. Processing circuit 500 may include any number of processors and memories. In other words, processor 502 may represent the collective processing devices of processing circuit 500 and memory 504 may represent the collective storage devices of processing circuit 500. Processor 302 and memory 504 may be on the same printed circuit board or may be in communication with each other via a bus or other form of connection.

I/O hardware 506 includes the interface hardware used by processing circuit 500 to receive data from other devices and/or to provide data to other devices. For example, a command may be sent from processing circuit 500 to a controlled device of gaming machine 102 via I/O hardware 506. I/O hardware 506 may include, but is not limited to, hardware to communicate on a local system bus and/or on a network. For example, I/O hardware 506 may include a port to transmit display data to an electronic display and another port to receive data from any of the devices connected to network 206 shown in FIG. 2.

Processing circuit 500 may store applications 508-510 in memory 504 (e.g., a first through nth application) for execution by processor 502, according to various implementations. Applications 508-510 may include executable code for one or more thick or thin client games. Thick client games generally refer to gaming applications that include all of the logic and graphics for a game. Thin client games, in contrast, generally refer to gaming applications in which the game logic is executed on a remote device and provided to another device running a thin client. For example, the game logic may be executed on a server and graphics representing the outcome of the game may be provided to a gaming machine for display within a thin client (e.g., Adobe Flash or another such application). Applications 508-510 may also include, but are not limited to, executable applications that perform accounting functions (e.g., tracking the amount of money or credits received by a gaming machine and paid out by a gaming machine), loyalty-related functions (e.g., tracking the wagered amounts by a player, tracking the amount of game time played by the player, by crediting the player's loyalty account with loyalty points, etc.), hospitality-related functions (e.g., allowing a player to make reservations for a show or restaurant, allowing a player to request a favorite drink, etc.), operation-related functions (e.g., tracking operational errors of a gaming machine), and other functions.

One or more of applications 508, 510 may be configured to communicate with other applications via a message-oriented protocol. Exemplary message-oriented protocols include, but are not limited to, STOMP, the Extensible Messaging and Presence Protocol (XMPP), and the Advanced Message Queuing Protocol (AMQP). The message-oriented protocol may be implemented with or without a message broker, in various embodiments. For example, application 508 may send a message via the message-oriented protocol to a message broker stored locally in memory 504 or on another device via I/O hardware 506.

In various embodiments, the message-oriented protocol may use a publish-subscribe messaging format. In such a format, the application sending a message does not designate the endpoint receivers of the message. Instead, the message may be published to a topic. Applications subscribed to the topic may then receive the published message. Thus, message communication between applications may be scalable without requiring changes to the code of the applications (e.g., a message may be communicated to any number of other applications by subscribing the other applications to the corresponding topic).

Applications 508, 510 may generate commands and receive messages via the message-oriented protocol. In one or more of applications 508, 510 may generate topic subscriptions 512 to subscribe to a particular topic. For example, application 508 may be a gaming application (e.g., a slot game) that subscribes to a loyalty-related topic managed by a message broker. One or more of applications 508, 510 may also generate published messages 514 that are published to topics managed by the message broker. If a message is published to one of the topics in topic subscriptions 512, the message broker may send one or more returned messages 516 to the subscribing application. For example, application 508 may receive a loyalty-related message from a remote server, if application 508 is subscribed to a loyalty-related topic managed by the message broker. Other communicated commands (not shown) may include requests to unsubscribe from topics, message receipt confirmations, and requests to connect or disconnect from a message broker.

In one embodiment, memory 504 may include a gaming protocol <-> messaging protocol converter 518. Gaming protocol <-> messaging protocol converter 518 may be configured to convert any of topic subscriptions 512, published messages 514 into conformity with a gaming protocol. The converted topic subscriptions 512 and published messages 514 may be wrapped in a gaming protocol, such as G2S and sent to another device via I/O hardware 506 (e.g., the device executing the message broker). Similarly, processing circuit 500 may receive returned messages 516 sent using the gaming protocol. In such a case, gaming protocol <-> messaging protocol converter 518 may convert the communication from the gaming protocol into the format of the message-oriented protocol and provide the message to one of applications 508, 510.

Figure 6:
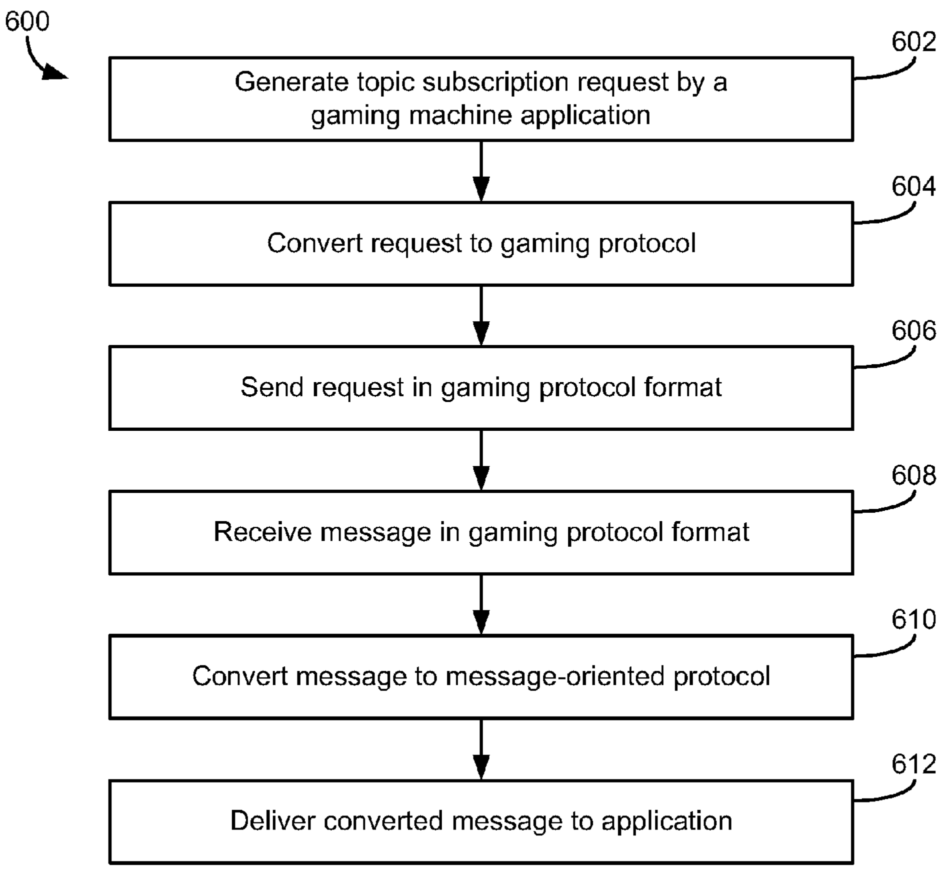
FIG. 6 is a flow diagram of a process for using a message-oriented protocol in a gaming environment, according to an exemplary embodiment.

Referring now to FIG. 6, a flow diagram is shown of a process 600 for using a message-oriented protocol in a gaming environment, according to an exemplary embodiment. Process 600 may be implemented by one or more processing circuits configured to execute stored machine instructions. For example, process 600 may be implemented by a processing circuit of a gaming machine or another device in communication with a gaming machine. Process 600 generally allows the use of a standardized, message-oriented protocol to be used by applications of the gaming machine.

Process 600 includes generating, by an application of a gaming machine, a topic subscription request using a message-oriented protocol (step 602). A message-oriented protocol generally refers to any protocol that allows applications to subscribe or publish messages to a topic. Exemplary message-oriented protocols include STOMP, XMPP, AMQP, and any other messaging protocol that uses a publish-subscribe methodology. In some embodiments, topics and message delivery may be managed by a message broker. For example, a slot game application on a gaming machine may request subscription to a topic managed by a message broker on a remote server.

Process 600 includes converting the topic subscription request into a gaming protocol (step 604). Generally, a gaming protocol may be any standardized communication protocol developed for use in a gaming environment. Exemplary gaming protocols include G2S, SAS, and any other standard communication protocol used in the gaming industry. For example, a topic subscription request generated according to STOMP may be converted into a G2S message by wrapping the text-based, STOMP message in G2S communication format. In some cases, the gaming protocol may be converted into another gaming protocol prior to delivery to the message broker. For example, an SAS message may be converted into a G2S message before being delivered to the message broker.

Process 600 further includes sending the request in the gaming protocol format to a message broker (step 606). In some embodiments, the message broker may be executed on the same device as another application that publishes messages to the topic. For example, a server may execute the message broker and another application that communicates with the gaming machine application by publishing messages to the topic. A gaming protocol may also encrypt the transmitted message, in one embodiment.

Process 600 includes receiving a message in the gaming protocol format from the message broker (step 608). For example, a processing circuit of a gaming machine may receive a message from a server in accordance with a gaming protocol. The received message may be published by another application on the gaming machine, a different gaming machine, the server executing the message broker, or a different server. For example, a server devoted to administration of the gaming machine may send a message to the gaming machine by publishing the message to the subscribed topic.

Process 600 includes converting the received message in the gaming protocol format into the messaging-oriented protocol format (step 610). For example, a message may be received by a gaming machine in the G2S protocol format and be converted into the STOMP format. In other words, the message-oriented protocol may be implemented on top of existing infrastructure that uses a gaming protocol.

Process 600 also includes delivering the converted message to the gaming machine application (step 612). Once the received message has been converted from the gaming protocol into the message-oriented protocol format, it may be sent to the gaming machine application for further processing. In one embodiment, the gaming machine application may execute asynchronously from the messaging (e.g., the gaming machine application may continue to execute normally until the message is received). In another embodiment, the gaming machine application may wait until the message is received.

In other words, each of applications 508-510 may include all of the logic to run the game and determine the outcome of the game. For example, game 310 may include graphics 322 (e.g., the display data for the game provided to an electronic display) and game logic 320 (e.g., the logic used to conduct the game and determine its outcome). Game logic 320 may include one or more pseudo-random number generators used to determine the outcome of the particular game. Applications 508-510 may be of a certain type or may be of varying types. For example, applications 508-510 may be different slot games or game 310 may be a slot game and game 312 may be a poker game. Applications 508-510 may be installed in memory 504 by a technician or may be installed remotely by server 208.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of using a message-oriented protocol in a gaming machine, said method comprising:

generating, by a processing circuit of the gaming machine, a topic subscription request by a bonus-determining application on the gaming machine, the topic subscription request associated with a bonus-related topic;

sending, by the gaming machine, the topic subscription request to a message broker;

receiving, by the message broker, the topic subscription request and subscribing the bonus-determining application to the bonus-related topic;

receiving, by the message broker, a message published to the bonus-related topic by a primary-game application on the gaming machine, the primary-game application different from the bonus-determining application;

determining, by the message broker, which of a plurality of different applications subscribe to the bonus-related topic;

sending, by the message broker, the message published to the bonus-related topic to each application subscribed to the designated topic, including the bonus-determining application;

receiving, at the processing circuit, the message published to the bonus-related topic; and altering execution of the bonus-determining application on the gaming machine based in part on the received message.

2. The method of claim 1, further comprising:

converting, by the processing circuit, the topic subscription request into a gaming protocol format, wherein the topic subscription request sent to the message broker is in the gaming protocol format; and converting, by the processing circuit, the received message from the gaming protocol format into a format of the message-oriented protocol.

3. The method of claim 2, wherein the gaming protocol comprises the Game to System (G2S) Protocol.

4. The method of claim 2, wherein the message-oriented protocol comprises the Simple Text Oriented Messaging Protocol (STOMP).

5. A gaming system comprising:

a gaming machine comprising a processing circuit configured to:

(a) generate a topic subscription request by a bonus-determining application on the gaming machine, the topic subscription request associated with a bonus-related topic;

(b) send the topic subscription request to a message broker;

(c) receive a message published to the bonus-related topic, the message being published to the bonus-related topic by a primary-game application on the gaming machine, the primary-game application different from the bonus-determining application; and (d) alter execution of the bonus-determining application on the gaming machine based in part on the received message; and the message broker configured to:

(a) receive the topic subscription request;

(b) subscribe the bonus-determining application to the bonus-related topic;

(c) receive the message published to the bonus-related topic;

(d) determine which of a plurality of different applications subscribe to the bonus-related topic; and (e) send the message published to the bonus-related topic to each application subscribed to the bonus-related designated topic, including the bonus-determining application.

6. The gaming system of claim 5, wherein the processing circuit is further configured to:

convert the topic subscription request into a gaming protocol format, wherein the topic subscription request sent to the message broker is in the gaming protocol format; and convert the received message from the gaming protocol format into a format of the message-oriented protocol.

7. The gaming system of claim 6, wherein the gaming protocol comprises the Game to System (G2S) Protocol.

8. The gaming system of claim 6, wherein the message-oriented protocol comprises the Simple Text Oriented Messaging Protocol (STOMP).

9. A method of using a message-oriented protocol in a gaming environment comprising:

generating, by a processing circuit of an electronic gaming machine, a first topic subscription request by a first application on the electronic gaming machine, the first topic subscription request associated with a designated topic;

generating, by the processing circuit of the electronic gaming machine, a second topic subscription request by a bonus-determining application on the electronic gaming machine, the second topic subscription request associated with a bonus-related topic, the bonus-determining application being different from the first application;

sending, by the electronic gaming machine, the first and second topic subscription requests to a message broker;

receiving, by the message broker, the first and second topic subscription request and subscribing the first application to the designated topic and the bonus-determining application to the bonus-related topic;

receiving, by the message broker, a first message published to the bonus-related topic by a primary-game application that is different from the first application and the bonus-determining application and that is executed on the electronic gaming machine;

receiving, by the message broker, a second message published to the designated topic by a server different from the electronic gaming machine;

determining, by the message broker, which of a plurality of different applications subscribe to the designated topic and which of the plurality of different applications subscribe to the bonus-related topic; and sending, by the message broker: (1) the first message published to the bonus-related topic to each application subscribed to the bonus-related topic, including the bonus-determining application; and (2) the second message published to the designated topic to each application subscribed to the topic, including the first application.

10. The method of claim 9, further comprising:

receiving, at the processing circuit, the first and second messages in a gaming protocol format;

converting, by the processing circuit, the first and second messages from the gaming protocol format into a message-oriented protocol format; and providing the first and second messages in the message-oriented protocol format to the message broker.

11. The method of claim 10, wherein the gaming protocol comprises the Game to System (G2S) Protocol and the message-oriented protocol comprises the Simple Text Oriented Messaging Protocol (STOMP).

12. A gaming system comprising:

an electronic gaming machine including processing circuit configured to:

(a) generate a first topic subscription request by a first application on the electronic gaming machine, the first topic subscription request associated with a designated topic;

(b) generate a second topic subscription request by a bonus-determining application on the electronic gaming machine, the second topic subscription request associated with a bonus-related topic, the bonus-determining application being different from the first application;

(c) send the first and second topic subscription requests to a message broker;

(d) receive a first message published to the bonus-related topic by a primary-game application that is different from the first application and the bonus-determining application and that is executed on the electronic gaming machine; and (e) receive a second message published to the topic by a server different from the electronic gaming machine; and the message broker configured to:

(a) receive the first and second topic subscription requests;

(b) subscribe the first application to the designated topic and the bonus-determining application to the bonus-related topic;

(c) receive the first message published to the bonus-related topic and the second message published to the topic;

(d) determine which of a plurality of different applications subscribe to the designated topic and which of the plurality of different applications subscribe to the bonus-related topic; and (e) send: (1) the first message published to the bonus-related topic to each application subscribed to the bonus-related topic, including the bonus-determining application; and (2) the second message published to the designated topic to each application subscribed to the designated topic, including the first application.

13. The gaming system of claim 12, wherein the processing circuit is further configured to:

receive the first and second messages in a gaming protocol format;

convert the first and second messages from the gaming protocol format into a message-oriented protocol format; and provide the first and second messages in the message-oriented protocol format to the message broker.

14. The gaming system of claim 13, wherein the gaming protocol comprises the Game to System (G2S) Protocol and the message-oriented protocol comprises the Simple Text Oriented Messaging Protocol (STOMP).

* * * * *